H. W. WETZEL.
FLY TRAP AND CATCHER.
APPLICATION FILED MAY 11, 1918.

1,288,779.

Patented Dec. 24, 1918.

Witness
Alfred J. Bratton

Inventor
Henry W. Wetzel
By Victor J. Evans
Attorney

UNITED STATES PATENT OFFICE.

HENRY W. WETZEL, OF PHILADELPHIA, PENNSYLVANIA.

FLY TRAP AND CATCHER.

1,288,779.  Specification of Letters Patent.  Patented Dec. 24, 1918.

Application filed May 11, 1918. Serial No. 233,993.

*To all whom it may concern:*

Be it known that I, HENRY W. WETZEL, a citizen of the United States, residing at Philadelphia, in the county of Philadelphia and State of Pennsylvania, have invented new and useful Improvements in Fly Traps and Catchers, of which the following is a specification.

The invention relates to fly traps and has for an object to provide a device for catching flies and for trapping the same.

The invention comprehends among other features, the provision of a simple device, consisting of few parts which can be cheaply manufactured, the device being employed for the purpose of catching flies as they are flying through the air, or catching flies when they have settled on a wall or ceiling, the device being so arranged and constructed that the fly will not be killed, but caught alive, thus preventing any smearing or marring of the wall or ceiling or article of furniture upon which the fly may have settled.

Still further, the invention provides for a trap that can be conveniently placed upon a table or the like, and in which when flies once gain access thereto, they can not easily escape therefrom.

In the further disclosure of the invention, reference is to be had to the accompanying drawing, constituting a part of this specification, in which similar characters of reference denote corresponding parts in all the views, and in which—

Figure 1:
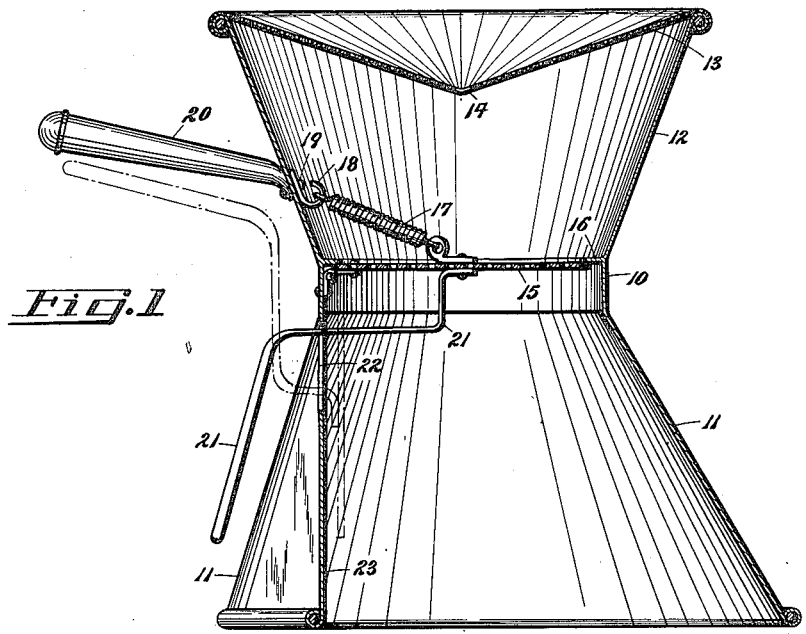
Figure 2:
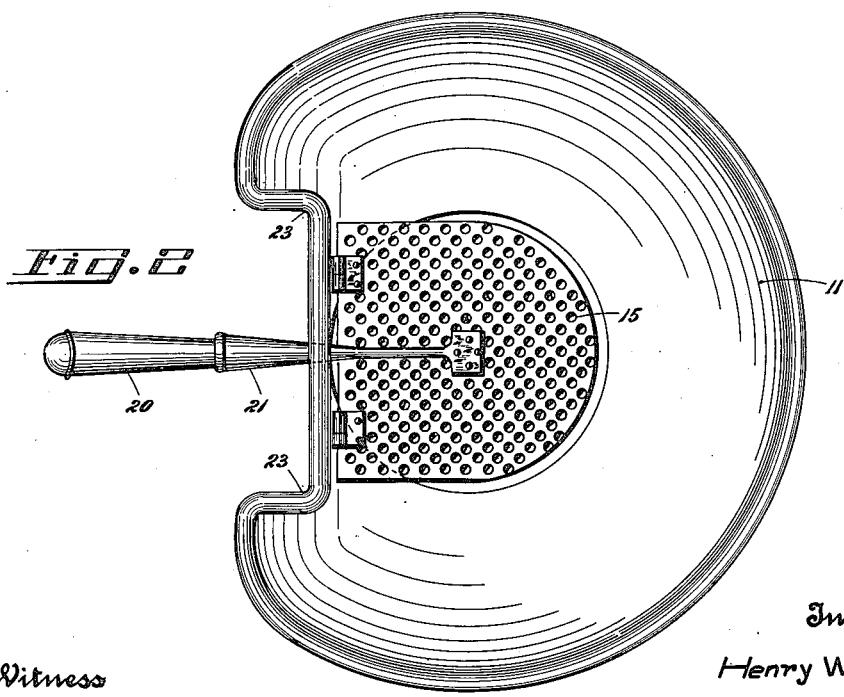

Figure 1 is a vertical sectional view taken through the device, the open position of the closure being shown in dotted lines, and Fig. 2 is a bottom plan view.

Referring more particularly to the views, 10 indicates a casing which is formed with a flared entrance or mouth 11, and with an oppositely flared compartment 12, the open end of which is normally closed by an inverted conical screen 13 having an aperture 14 at its lower extremity. Hinged within the casing 10 at a point adjacent to the inner ends of the casings 11 and 12 is an apertured closure 15, which normally rests against a circular rim 16 forming a part of the casing, said closure being held in closed position by a contractile spring 17 suitably secured to one side of the closure and to a hook 18 in the casing, said hook being retained by a rivet 19, which also serves to secure an exterior handle 20. The closure 15 is provided with a handle 21 which passes through a slot 22 in the casing to the exterior thereof, and the casing is recessed or indented at 23 to permit of the proper working of the handle 21.

Now when the device is in the position shown in Fig. 1, with the base of the casing or entrance 11 resting upon a table to close said entrance, it will be clear that when flies which may be lured to the top or screen 13 by a suitable bait contained within the casing 12, pass through the opening 14, they of course will find it almost impossible to again escape through the opening, therefore being confined in the chamber or compartment 12.

When it is desired to use the device as a fly catcher, the same is grasped by the handle 20, the handle 21 being previously moved in a position shown in dotted lines to open the closure 15. The device can now be swished through the air to catch a fly in the mouth 11, or placed against a ceiling or wall, or article of furniture to catch a fly that has settled, and of course upon catching the fly, the releasing of the handle 21 will cause the spring 17 to swing the closure 15 into closed position. The closure 15 is preferably perforated so as to allow the least resistance to the air as the device is used for the purpose of catching flies that may be on the wing.

From the foregoing description it will be seen that the device described is of simple construction; consists of few parts that can not readily get out of order; and although I have shown a particular form of my invention, it will be seen that various slight changes may be made without departing from the spirit thereof, the scope of which is defined in the appended claim.

I claim:

A device of the character described, comprising a casing formed to flare in both directions from its central portion, with one of the flared portions forming the mouth of the casing, and the other flared portion adapted to form a compartment, an apertured screen on one end of the casing to close one end of said compartment, a circular rim around the central portion on the interior thereof, an apertured closure hinged to the casing adjacent said rim, said closure being of sufficient diameter to cause the closure to bear against one side of the rim, limiting the inward movement of the closure toward the compartment, a handle for the closure and projecting through the mouth of the casing and exterior thereof, a handle for the casing and a spring secured to the casing and to the closure to normally hold the closure against said rim to partially close the other end of said compartment.

In testimony whereof I affix my signature.

HENRY W. WETZEL.